April 12, 1938.   M. A. KENT   2,113,986
STORAGE FOR MOTOR CARS
Filed March 22, 1927    11 Sheets-Sheet 1
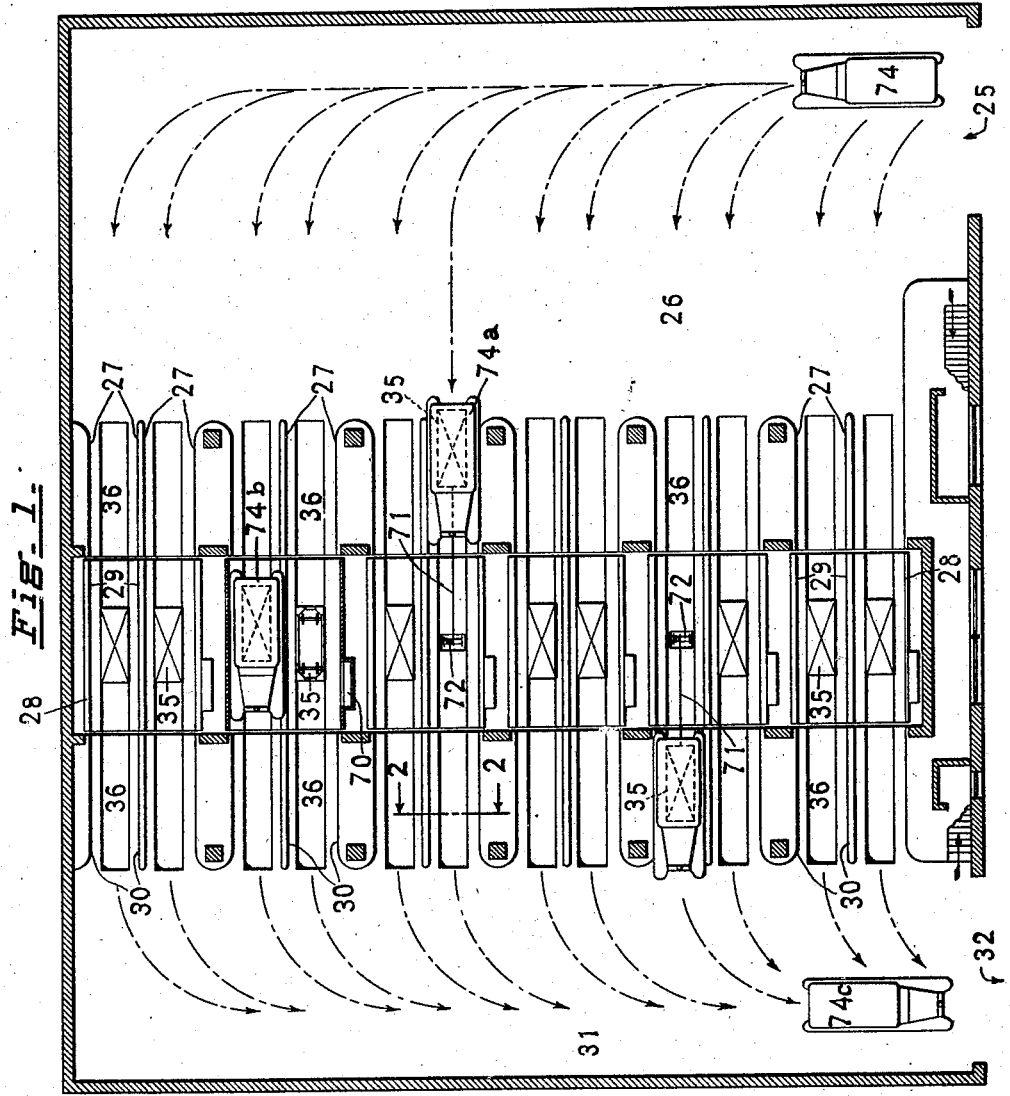
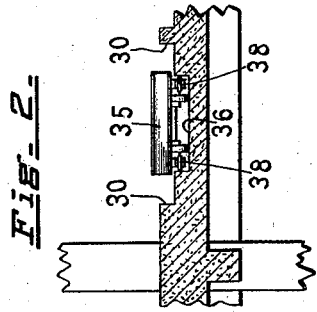

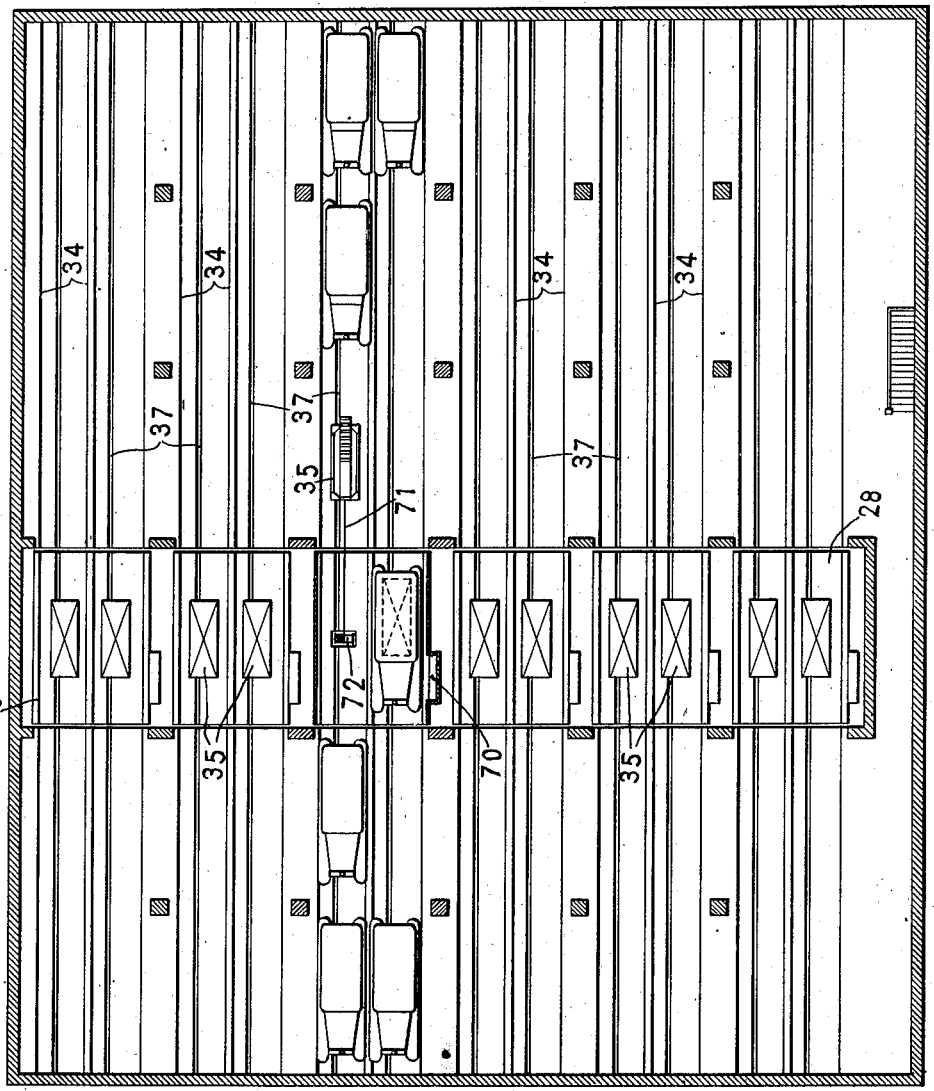

April 12, 1938.   M. A. KENT   2,113,986
STORAGE FOR MOTOR CARS
Filed March 22, 1927   11 Sheets-Sheet 3

INVENTOR
Milton A. Kent
BY
Frank A. Kent
ATTORNEY

April 12, 1938. M. A. KENT 2,113,986
STORAGE FOR MOTOR CARS
Filed March 22, 1927 11 Sheets-Sheet 4
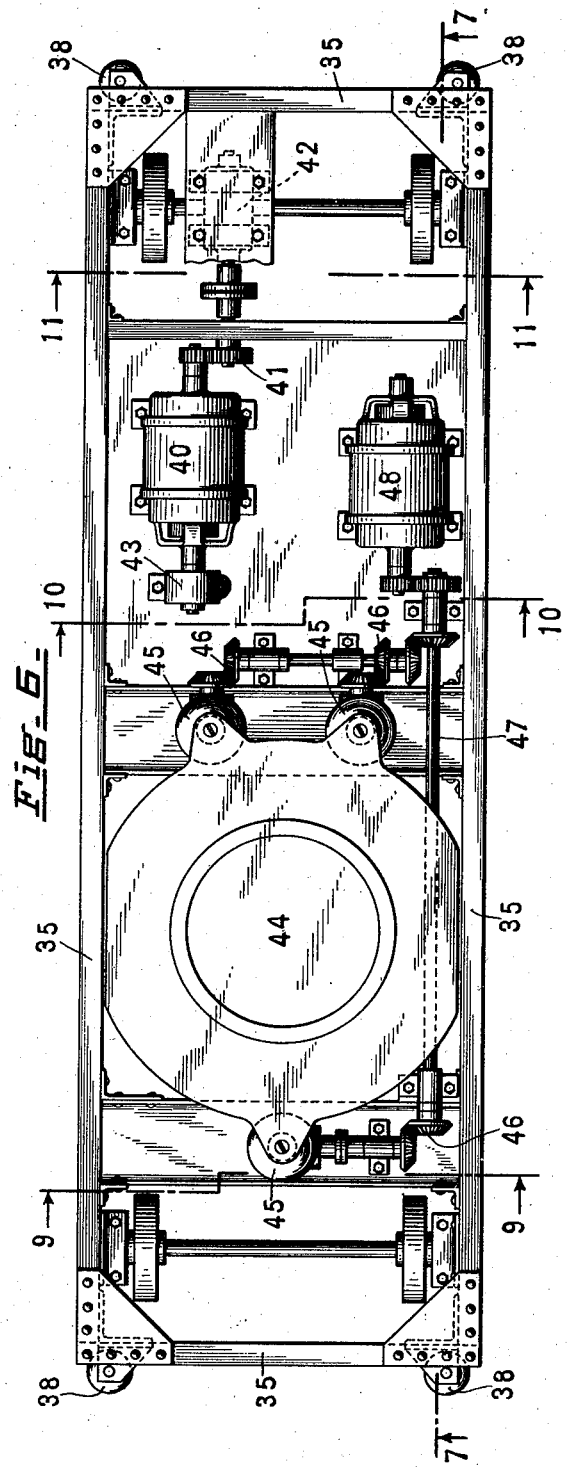
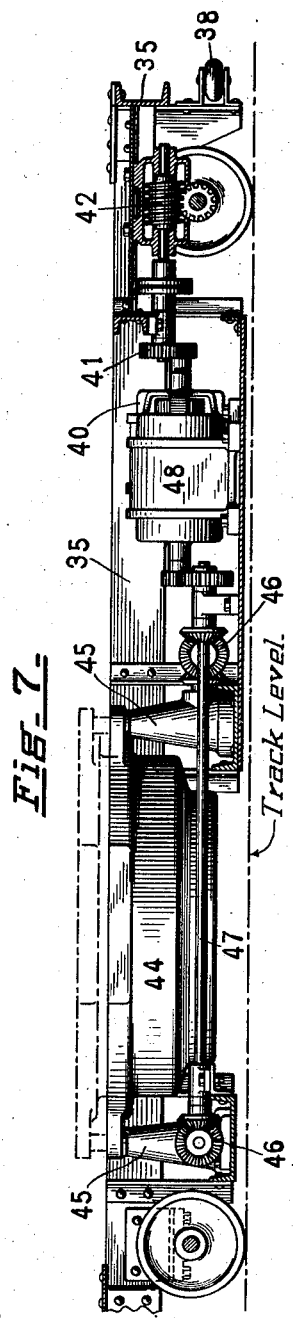

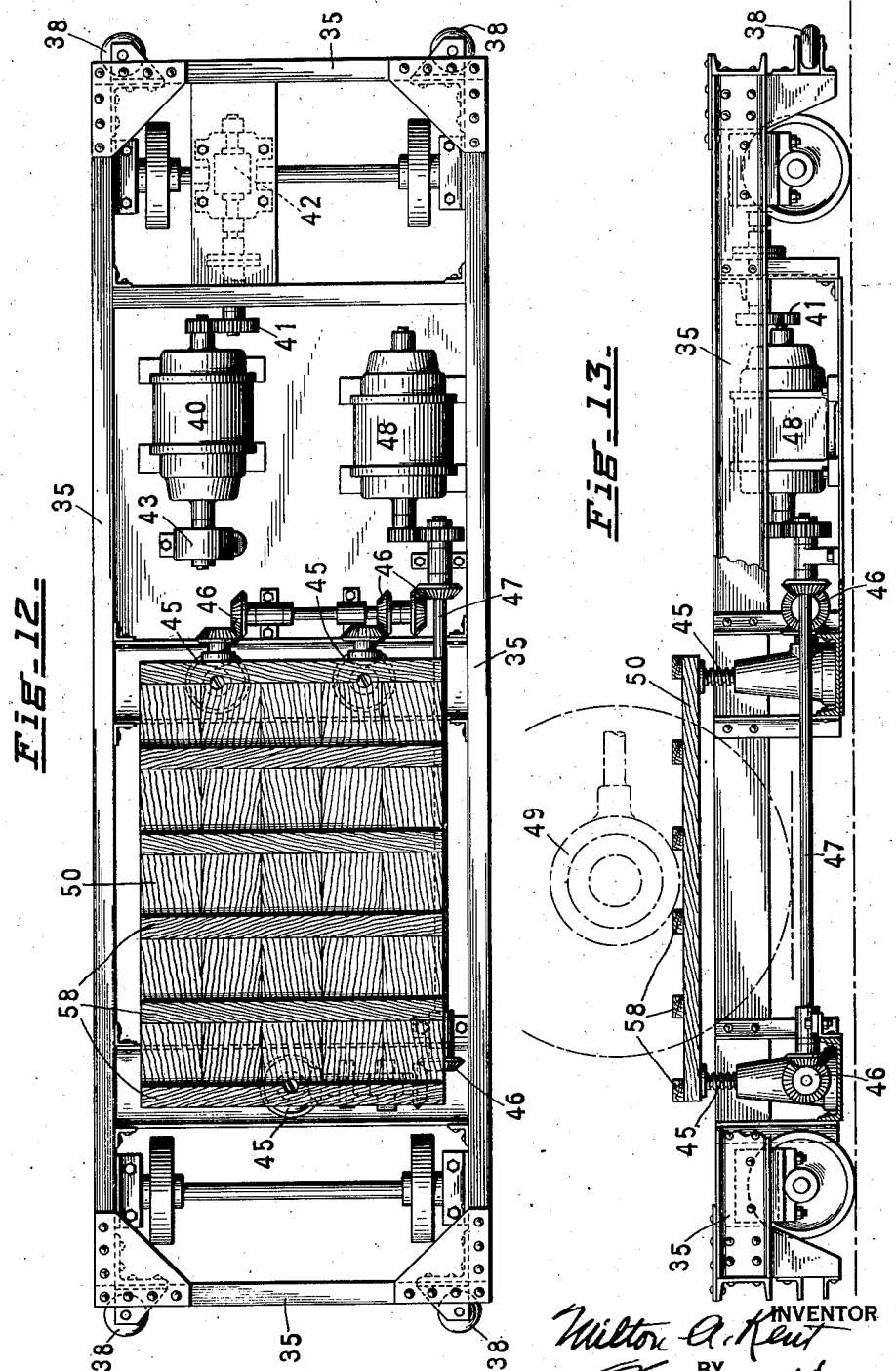

April 12, 1938.  M. A. KENT  2,113,986
STORAGE FOR MOTOR CARS
Filed March 22, 1927   11 Sheets-Sheet 7
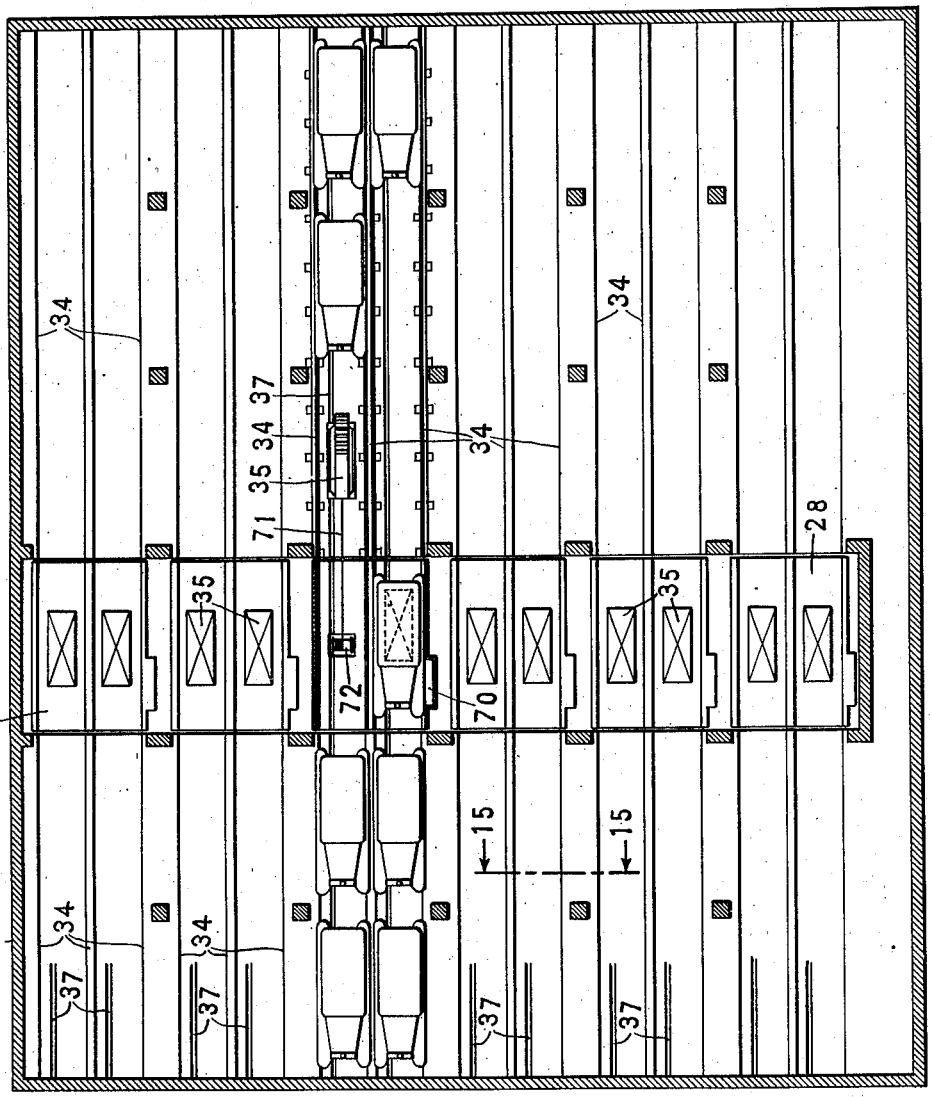
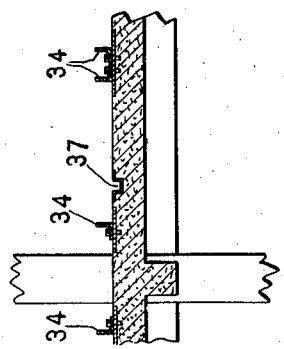
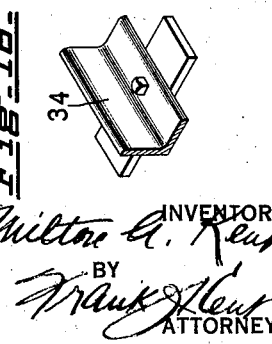

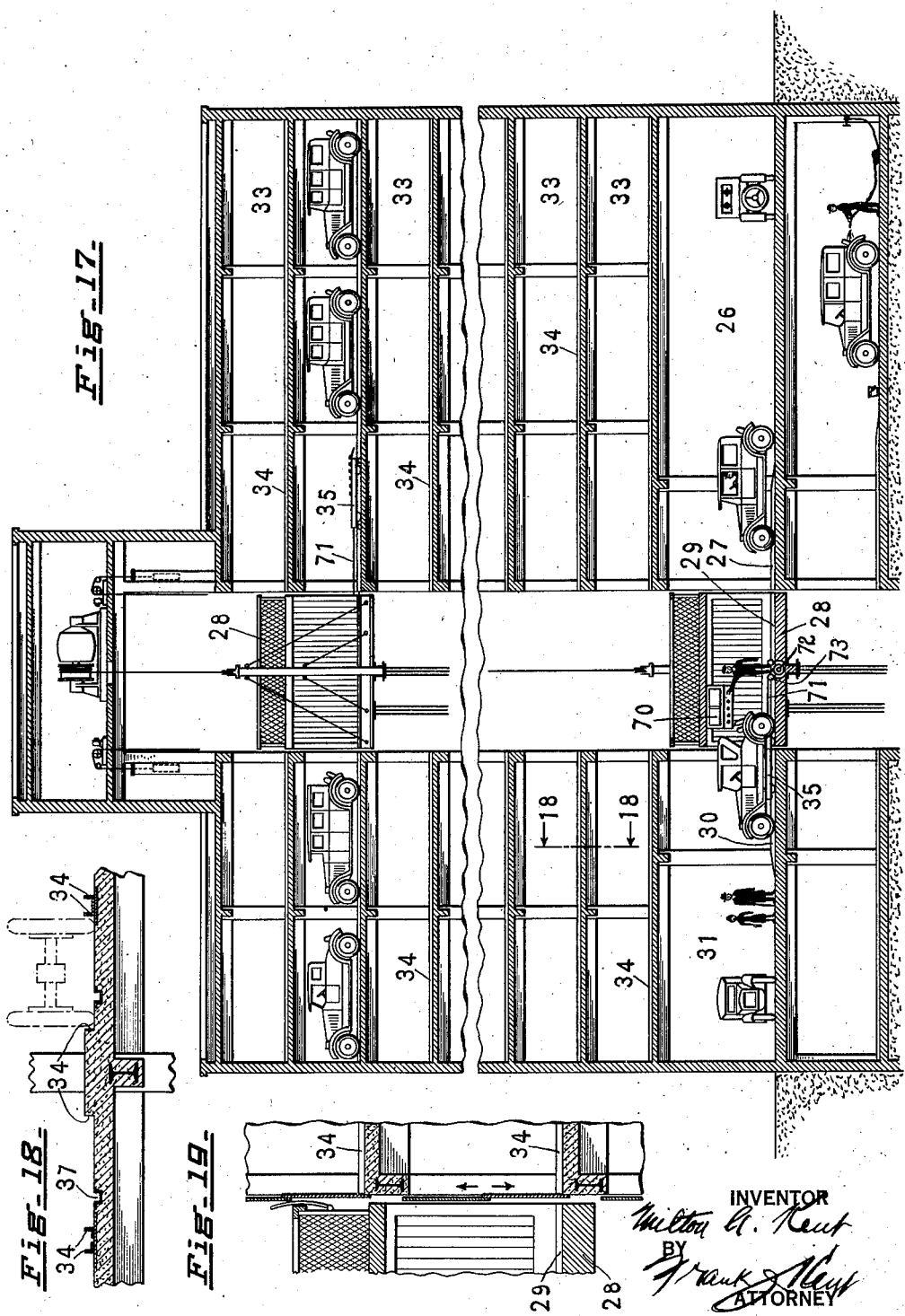

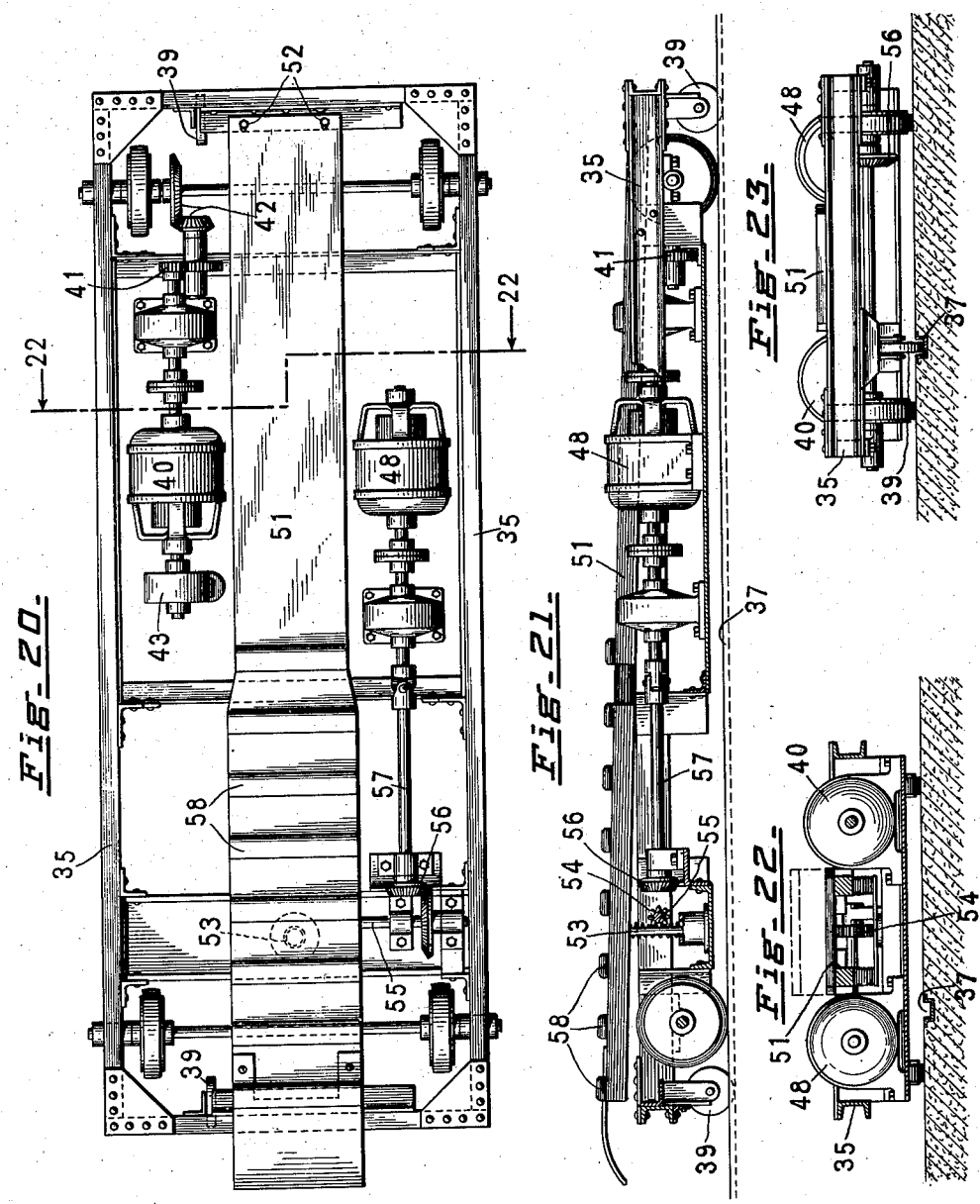

April 12, 1938. M. A. KENT 2,113,986
STORAGE FOR MOTOR CARS
Filed March 22, 1927 11 Sheets-Sheet 10
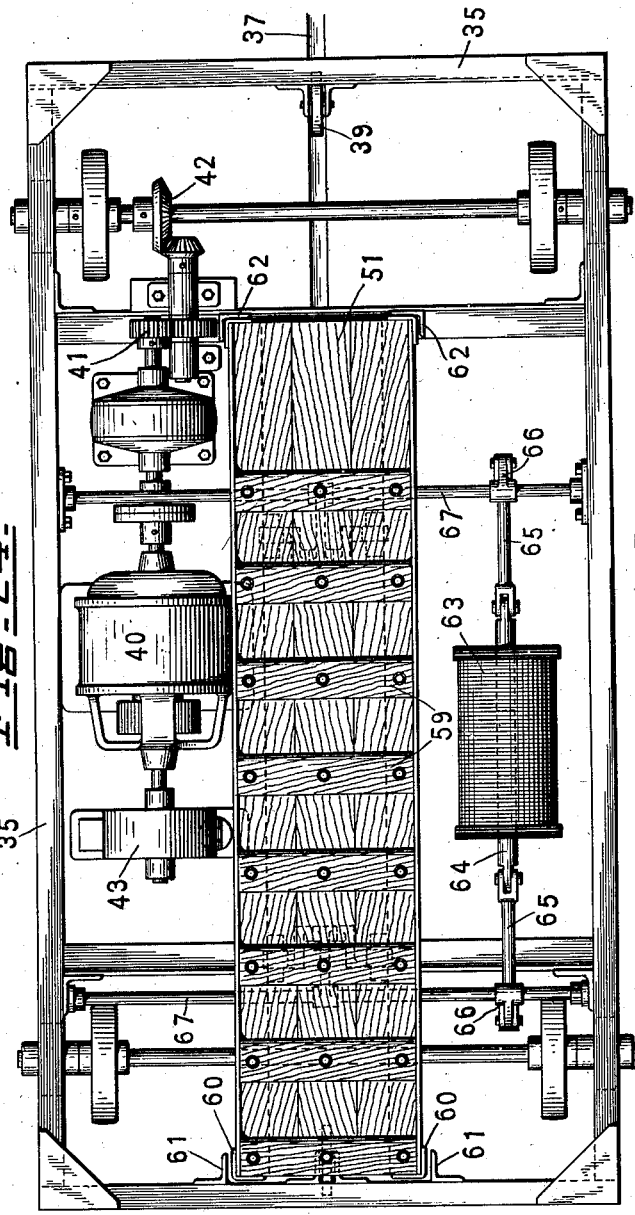
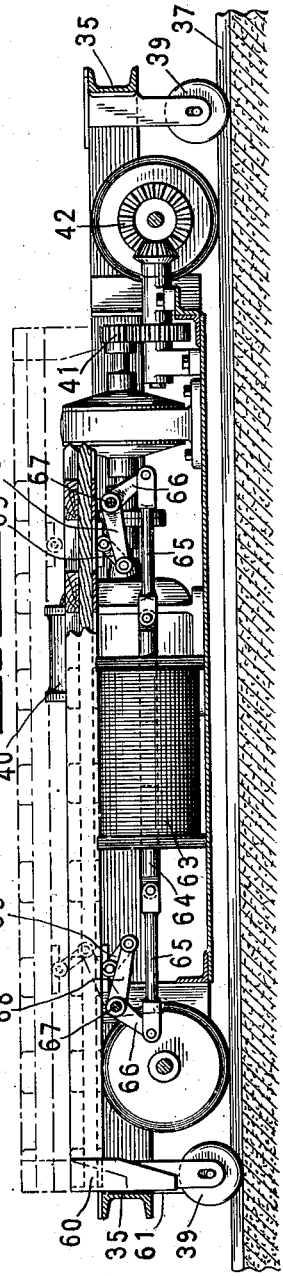
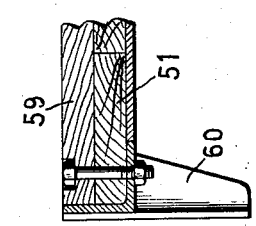
INVENTOR
Milton A. Kent
BY
Frank J. Kent
ATTORNEY April 12, 1938.  M. A. KENT  2,113,986
STORAGE FOR MOTOR CARS
Filed March 22, 1927  11 Sheets-Sheet 11
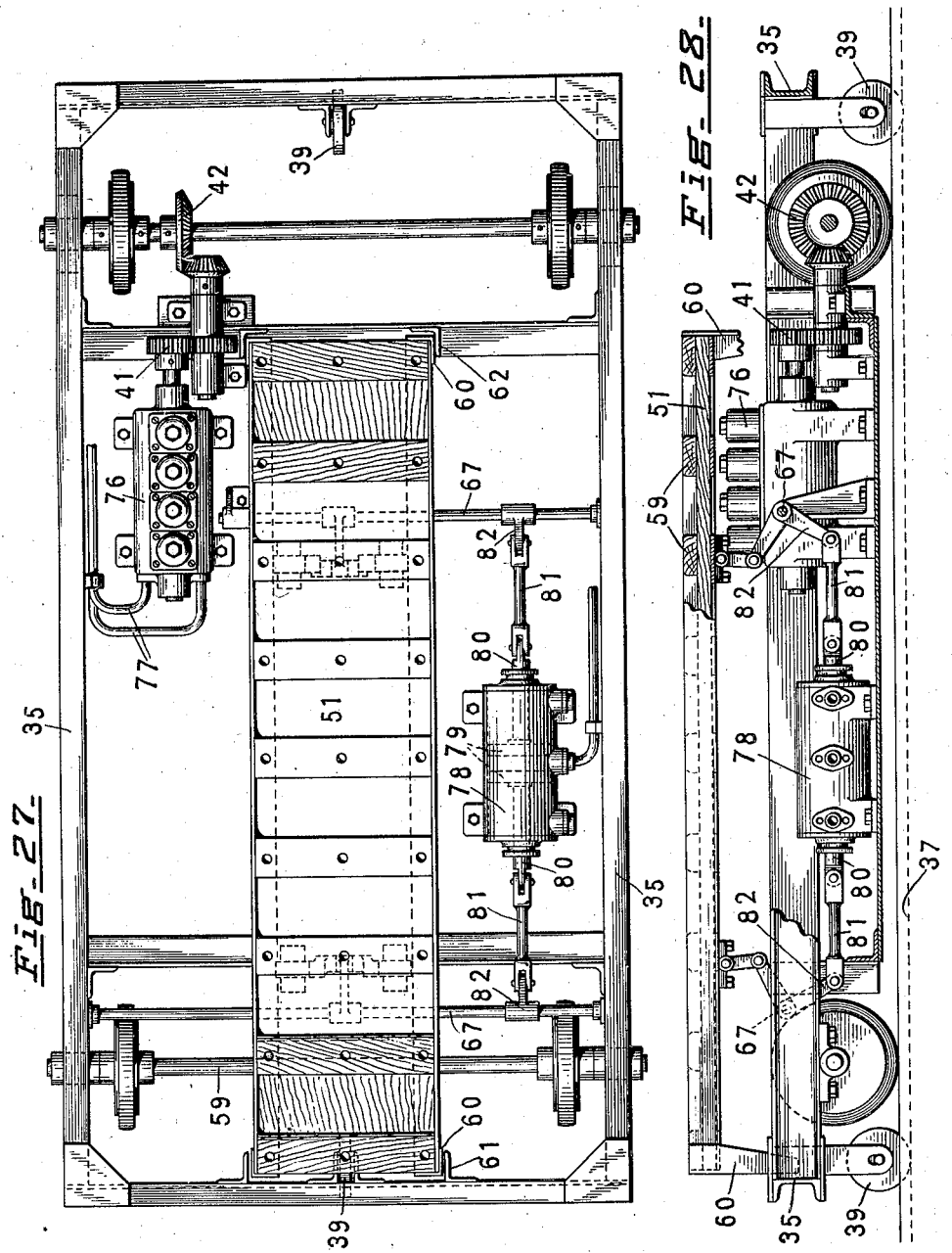

Patented Apr. 12, 1938

2,113,986

UNITED STATES PATENT OFFICE 2,113,986

STORAGE FOR MOTOR CARS

Milton A. Kent, Larchmont, N. Y., assignor, by mesne assignments, to Electric Garages, Inc.

Application March 22, 1927, Serial No. 177,258

23 Claims. (Cl. 214—16.1)

This invention relates to the parking and storage of automobiles.

The principal objects of the invention are to provide a garage structure having a maximum storage capacity and to enable the quick shifting of the cars so as to utilize such storage capacity to the fullest extent.

Briefly, the invention comprises in a preferred embodiment, a garage structure having a wide entrance way into which the cars can be driven and left standing in receiving stalls, elevators lined up with said stalls, electrically driven parking cars operating from said elevators out beneath the received cars and controllable to effect a towing coupling with such cars so that in their return to the elevators they will carry the received cars onto the elevators, these parking cars being operable in reverse fashion to carry the cars out into the parking spaces in the upper floors of the structure or to take the parked cars out of such spaces back to the elevator for return to the delivery floor, where said parking machines can again be operated to carry the cars out into delivery stalls, ready to be driven away.

Other important novel features of the invention will appear as the specification proceeds.

The present application is in part a continuation of Serial No. 60,022 filed October 2, 1925.

The drawings accompanying and forming part of this specification illustrate several preferred and practical embodiments of the invention, but it should be understood that the structure and apparatus are capable of further modification without departure from the true spirit and broad scope of the invention as hereinafter defined and claimed.

Figure 1 is a horizontal sectional and partial plan view of the structure illustrating diagrammatically the manner in which the cars are driven into the receiving stalls at one side of the elevators and removed from the delivery stalls at the opposite side of the elevators.

Figure 2 is an enlarged sectional view as on line 2—2 of Figure 1, showing one of the parking cars in the pit or sunken driveway provided for the same.

Figure 3 is a horizontal sectional and plan view of one of the storage floors of the building.

Figure 6 is a plan view of one of the parkers.

Figure 7 is a longitudinal sectional view of a parker as on line 7—7 of Figure 6.

Figure 9:
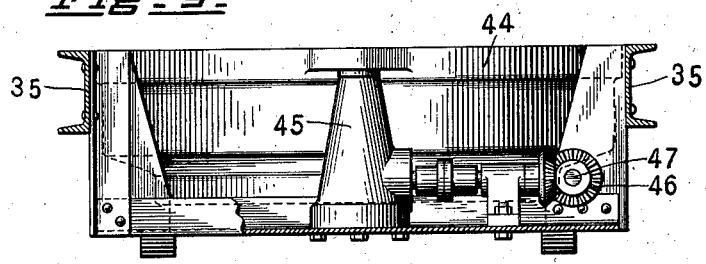
Figure 10:
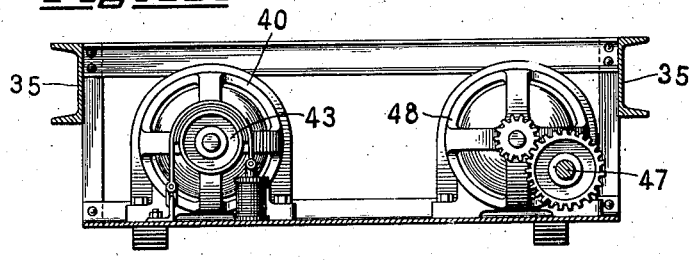
Figure 11:
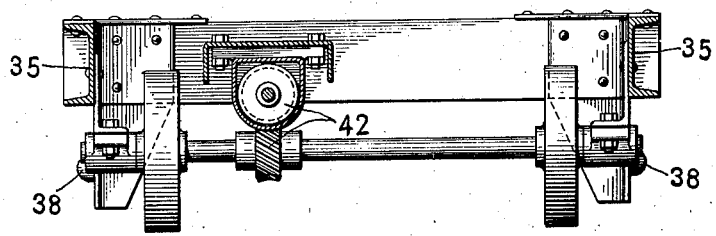

Figures 9, 10 and 11 are cross sectional views of the parker as on lines 9—9, 10—10 and 11—11 of Figure 6.

Figures 12 and 13 are plan and part longitudinal sectional views respectively of a parker having a platform style of jack for effecting a towing connection with the motor car.

Figure 14 is a horizontal sectional view showing a floor plan in which the guard curbs for the motor cars are replaced by upstanding angle irons bolted to the floor and in which the parking trucks are guided by having guide wheels tracking in grooves in the floor.

Figure 15 is an enlarged broken sectional view of a portion of this floor as taken on line 15—15 of Figure 14.

Figure 16 is a broken perspective of one of the removable upstanding floor guides.

Figure 17 is a vertical sectional view of the complete structure illustrating the leaving of cars for storage, the delivery of cars from storage and the parking of the cars in storage spaces.

Figure 18 is an enlarged sectional view of a form of flooring as on line 18—18 of Figure 17.

Figure 19 is a detail sectional view of the elevator mechanism.

Figure 20 is a plan view of a form of parker having guide wheels to track in the grooves in the floor and having a tilting form of pick-up jack.

Figure 21 is a longitudinal sectional view of the parker shown in Figure 20.

Figure 22 is a cross sectional view as on line 22—22 of Figure 20.

Figure 23 is an end elevation of the parker

Figures 24 and 25 are plan and broken longitudinal sectional views respectively of another form of the parker.

Figure 26 is an enlarged broken sectional view of a portion of the coupling member in the last form of parker showing particularly one of the corner guides therefor.

Figures 27 and 28 are plan and broken longitudinal sectional views respectively of a pressure pneumatically operated form of parker.

A general idea of the structure and operation will be gained by first referring to Figures 1 and 17, which show respectively the ground floor plan and a vertical section of the entire structure.

The cars are driven in through an entrance 25 onto the receiving floor 26 and turned sharply to the left between curbs or guides 27 defining receiving stalls. These stalls are lined up with elevators 28 having corresponding ways 29 thereon.

At the opposite side of the elevators, at the ground floor level are delivery stalls defined by the guideways 30, in line with the receiving and elevator ways so that cars for delivery may be placed in said stalls and then driven under their own power with a sharp left-hand turn out onto the delivery floor 31 and through a suitable exit 32.

Above the main floor are the storage floors 33 having ways 34 (Figures 3 and 14) lined up with the elevator ways so that cars may be delivered thereinto or removed therefrom without any steering complications.

The transfer of the cars from the receiving stalls onto the elevators, from the elevators into the storage ways, from said storage ways back onto the elevators and from the elevators into the delivery stalls is effected automatically, or semi-automatically by self-propelled trucks arranged to operate under the cars and controllable to effect a towing connection with the cars and to travel in one direction or another at will.

Figure 8:
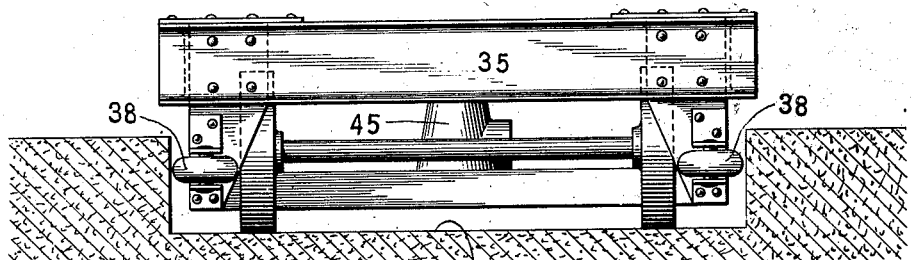
Figure 8 is an end elevation of the parker.

These transfer trucks or "parkers" as they may be appropriately termed are designated 35. They are suitably guided in the present disclosure for straight line movement in opposite directions across the elevators, either in pits or sunken ways 36, as in Figures 1, 3 and 8 or by means of sunken guide tracks 37, as in Figures 3 and 14 to 23 inclusive. In the first instance horizontally projecting rollers 38 at the ends of the truck frames guide the trucks by engagement with the side walls of the sunken driveways and in the second instance, vertically arranged wheels 39 at the ends of the truck frames extend down into the sunken tracks 37 to direct these parking trucks.

These guide tracks, it will be noted, both in the sunken pit form and in the single channel form extend clear across the elevators, in alinement with the tracks on the floors at opposite sides of the elevators. Each method of guiding has its own advantages. The parker must be low enough to pass under the cars in either case. The sunken pit construction allows more leeway in the design of the parker as to overall height but the second or single track method of guidance is a less expensive construction as the floors can be built flat and simply have the guide track laid thereon or set therein.

In the detail views, Figures 4 to 13 and 20 to 25, inclusive, the parkers are illustrated as low flat trucks narrow enough to pass between the wheels and low enough to pass beneath the chassis of the cars. These trucks are propelled by motors 40 drivingly connected with one axle of the truck by suitable reduction gearing at 41, 42, and are controlled by automatic brakes 43 on the motor shaft.

The towing connection with the cars may be effected in various ways, for instance, electromagnetically or mechanically and the coupling action may be accomplished in different ways.

Figure 4:
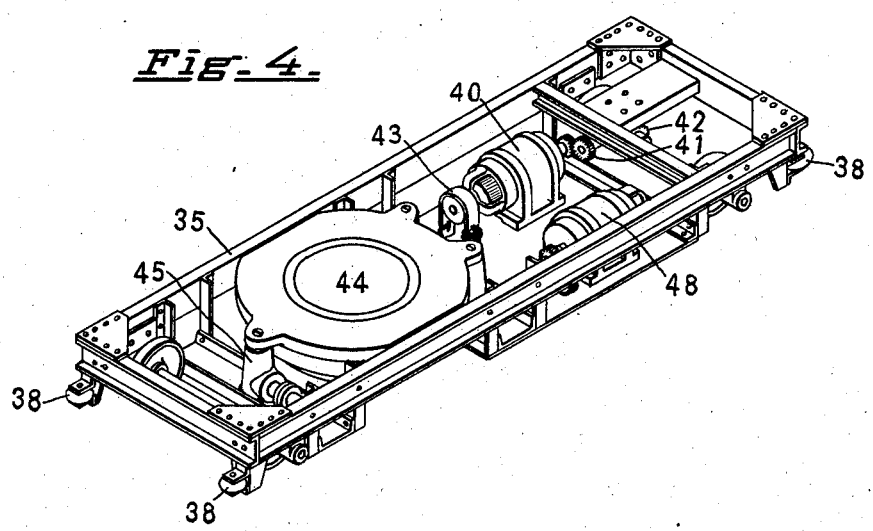
Figure 4 is a perspective view of one of the car shifting trucks or "parkers".
Figure 5:
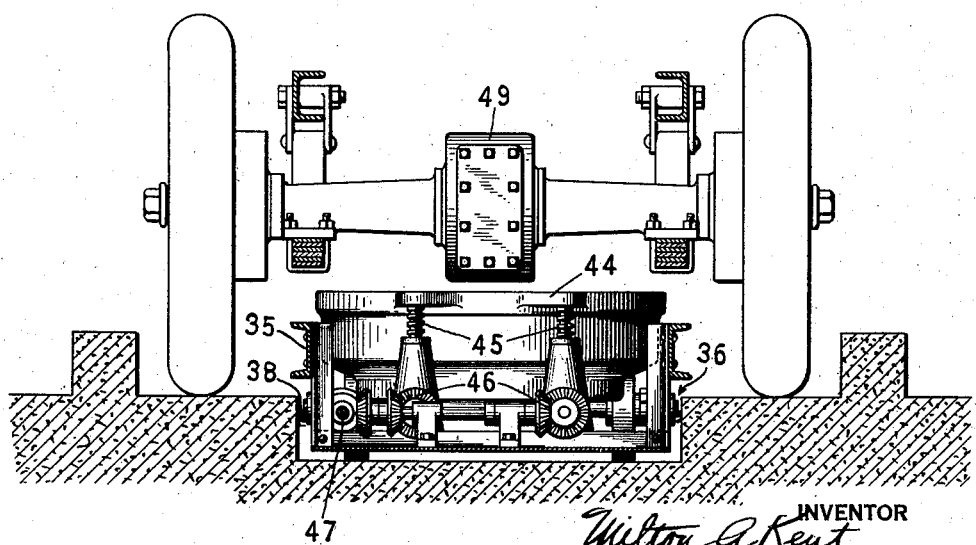
Figure 5 is a broken cross sectional view of one of these parking devices with its magnet raised in towing relation with the differential of a motor car.

Figures 4 to 11 illustrate a combination electromagnet and mechanical form of coupling involving a relatively large electromagnet 44 which can be raised or lowered by jack screws 45 driven by bevel gearing 46 and shafting 47 from an electric motor 48. This magnet is of sufficient strength to effect a towing coupling without actual contact, for instance, when raised into close relation with the differential housing 49 of the car as indicated in Figure 5.

The face of the magnet is finished so that it may be mechanically engaged with the differential housing or other portion of the car and may therefore be used as a combination magnetic-mechanical coupling or as either a magnetic or a mechanical coupling alone.

Figures 12 and 13 show how a plain mechanical coupling may be substituted for the magnetic coupling device. In these views a cross ribbed wooden platform 50 has been substituted for the electromagnet, it being raised and lowered by the jacks 45 to bring it into coupled relation with or uncouple it from the differential housing or other portion of the car.

Instead of the coupling platform being raised bodily as in Figures 12 and 13, the same may be simply raised and lowered at one end as indicated in Figures 20 to 23. In these views the coupling member is shown as a long plank or bar 51 having a loose pivotal connection 52 with the frame of the car at its forward lower end and having its rear end raised and lowered by a dependent rack 53 engaged by a pinion 54 on a cross shaft 55 driven by bevel gearing 56 and shafting 57 from the coupling motor 48. The rearward or active portion of this tilting coupler is shown as cross ribbed at 58 after the manner of the other platform so as to readily take hold of the under body of the car chassis.

Figures 24 and 25 illustrate a vertically operating mechanical coupling on the order of that shown in Figures 12 and 13, comprising a cross ribbed platform 59 having dependent corner angles 60 guided by vertical angles 61, 62 and raised by a powerful solenoid 63 having a movable core 64 connected by links 65 with the rock arms 66 of shafts 67, said shafts carrying other rock arms 68 connected by links 69 with the under side of the coupling member.

A special advantage of the last construction, aside from its simplicity is that the coupling member will automatically come to a stop when it has been raised by the solenoid far enough to effect a solid connection with the car and that it will lower automatically out of the way as soon as the solenoid is de-energized. This construction also automatically compensates for inequalities in the floor. The solenoid will hold the parts engaged irrespective of relative rising and falling movements of the parker and car.

As the parkers are automatically guided, the attendants may control them from stations located conveniently on the elevators, as indicated at 70 in Figures 1, 3 and 17 and said controls may consist, for instance as indicated in the latter figure, of a suitable arrangement of push button switches adapted to effect operation of the drive motors in opposite directions and the desired action of the coupling motors. The current for operating these motors is shown as supplied by flexible cables 71 which unwind from and wind on automatic take-up reels 72 mounted in the floors of the elevators, the cables passing over suitable guide rails 73 at opposite sides of the reels (Figure 17) so that the cars may travel one way or the other with equal facility.

Reviewing briefly, the operation is as follows: An entering car such as shown at 74 in Figure 1 is driven in through the entrance way 75 and with a sharp left-hand turn is entered in one of the receiving stalls 27 as at 74a, where it is left in the care of the attendant on that elevator. This attendant then sends out the parker on that elevator, couples it with the car and tows the car onto the elevator. The latter condition is shown at 74b in Figure 1. The elevator is then operated to carry the car, (or possibly cars, if they be double elevators, such as illustrated) to the desired floor and at the latter level the parker is made to push or tow the car out into the selected parking or storage space. The coupling mechanism is then operated to release the parker from the car and the parker is then made to retrace its way back onto the elevator, as indicated in the upper portion of Figure 17.

When a car is to be delivered to its owner, the elevator in line with the way in which the car is stored, is taken to that particular level, the parker is sent out into that storage way, coupled with the car and then retracted to the elevator and when the elevator is returned to the delivery floor, Figure 17, the parker is operated to propel the car out into the alined delivery stall 30, where the owner again assumes control, driving the car with a sharp left-hand turn, as shown at 74c out through exit 32.

The cars usually are stored with a view to their being accessible when required, but if one car should block the way of another, the car which is in the way may be shifted from its position across to the other side of the elevator or even be carried temporarily to another floor and returned later to its storage space, this being possible because of the short time it takes to shift the cars with these new parkers.

The parker may be operated and controlled by different forms of power. As an example, pressure operated motors may be employed for driving and for effecting the coupling between the parker and the cars. In Figures 27 and 28 a parker of this type is illustrated, wherein a pneumatic motor is indicated at 76 geared to drive the truck and supplied by fluid under pressure through flexible pipes 77 and a cylinder is shown at 78 having pistons 79 therein, connected by rods 80 and links 81 with rocker arms 82 on the platform elevating shafts 67. This elevating cylinder is supplied with fluid pressure by a hose 83, which with the hoses 77 may be wound on a reel carried by the elevator and controlled by suitable valve mechanism at the control station.

Applicant's parker is covered by the claims of Patent No. 2,070,792.

What is claimed is:

1. In combination, an elevator, receiving and delivery stalls for motor cars at opposite sides of said elevator and a parker having a travel across said elevator in both directions into and out of both stalls, said parker being arranged to pass beneath the cars in the stalls and provided with means for effecting a towing connection therewith and means comprising controls on the elevator for governing the traverse of the parker in both directions and for controlling the coupling and uncoupling of the same in respect to the cars.

2. In apparatus of the character disclosed, a housing structure having a receiving floor and storage floors above the same with ways for motor cars, elevators alined with said ways, a delivery floor with ways alined with said elevators, parkers travelling across the elevators and in said ways beneath the cars in said ways, power operated coupling devices on said parkers for connecting the parkers in towing relation with the cars and power control means on the elevators for effecting the propulsion and coupling actions of the parkers.

3. A building structure comprising a plurality of vertically spaced storage floors, a row of elevators arranged in contiguous, side-by-side relation, each elevator having its opposite ends open and being adapted to receive a motor car with the long axis of the motor car perpendicular to the open ends of the elevator, and a vertical row of storage stands arranged contiguous to each open end of each elevator, the storage stands being stationarily fixed relative to the walls of the building, and means connected to each elevator for towing a motor car, while said motor car is running on its own wheels, from a storage stand on either side of the elevator to the elevator.

4. A building structure comprising a plurality of vertically spaced storage floors, a row of elevators arranged in contiguous, side-by-side relation, each elevator having its opposite ends open and being adapted to receive a motor car with the long axis of the motor car perpendicular to the open ends of the elevator, and a vertical row of storage stands arranged contiguous to each open end of each elevator, the storage stands being stationarily fixed relative to the walls of the building, and a wheeled parking car co-operating with each elevator, the parking car being of such width and height that it can pass between the wheels and under the axles of an average motor car in a direction at right angles to the axles of the motor car while running on substantially the same floor level as the motor car, and means carried by the parking car for effecting a towing connection with the motor car without lifting the wheels of the motor car from the floor.

5. A building structure comprising a plurality of vertically spaced storage floors, a row of elevators arranged in contiguous, side-by-side relation, each elevator having its opposite ends open and being adapted to receive a motor car with the long axis of the motor car perpendicular to the open ends of the elevator, and a vertical row of storage stands arranged contiguous to each open end of each elevator, the storage stands being stationarily fixed relative to the walls of the building, and a wheeled parking car co-operating with each elevator, the parking car being of such width and height that it can pass between the wheels and under the axles of an average motor car in a direction at right angles to the axles of the motor car while running on substantially the same floor level as the motor car, coupling means carried by the parker for effecting a towing connection with the motor car, control means mounted on the elevator for controlling the translational movements of the parking car, and control means mounted on the elevator for controlling the coupling means.

6. A building structure comprising a plurality of vertically spaced storage floors, a row of elevators arranged in contiguous, side-by-side relation, each elevator having its opposite ends open and being adapted to receive a motor car with the long axis of the motor car perpendicular to the open ends of the elevator, and a vertical row of storage stands arranged contiguous to each open end of each elevator, the storage stands being stationarily fixed relative to the walls of the building, and a wheeled parking car co-operating with each elevator, the parking car being of such width and height that it can pass between the wheels and under the axles of an average motor car in a direction at right angles to the axles of the motor car while running on substantially the same floor level as the motor car, coupling means carried by the parker for effecting a towing connection with the motor car, control means mounted on the elevator for controlling the translational movements of the parking car, control means mounted on the elevator for controlling the coupling means, guide means extending across the elevator to guide the towing movements of the motor car, and guide means for the motor car in each storage space parallel to the guide means on the elevator.

7. In combination, a building having a plurality of vertically spaced floors, an elevator open at its opposite ends, two rows of vertically-spaced storage stands, one of said rows of stands being contiguous to one end of the elevator and the other of said rows being contiguous to the other end of the elevator, a wheeled parking car co-operating with the elevator, the parking car being of such width and height that it can pass between the wheels and under the axles of an average motor car in a direction at right angles to the axles of the motor car while running on substantially the same floor level as the motor car, and means carried by the parking car for effecting a towing connection with the motor car.

8. In combination, a building having a plurality of vertically spaced floors, an elevator open at its opposite ends, two rows of vertically-spaced storage stands, one of said rows of stands being contiguous to one open end of the elevator and the other of said rows being contiguous to the other end of the elevator, a wheeled parking car co-operating with the elevator, the parking car being of such width and height that it can pass between the wheels and under the axles of an average motor car in a direction at right angles to the axles of the motor car while running on substantially the same floor level as the motor car, and control means mounted on the elevator for controlling the coupling means.

9. A vehicle parking system comprising an elevator adapted to carry a vehicle, a wheeled parking car adapted to run completely under the vehicle in a direction parallel to the longitudinal axis of the vehicle, coupling means for forming a towing connection between the parking car and the vehicle, driving means for propelling the parking car, control means carried by the elevator for controlling the coupling means, and control means carried by the elevator for controlling the driving means.

10. A vehicle parking system comprising an elevator adapted to carry a vehicle, a wheeled parking car adapted to run completely under the vehicle in a direction parallel to the longitudinal axis of the vehicle, coupling means for forming a towing connection between the parking car and the vehicle, driving means for propelling the parking car, and a control panel carried by the elevator and having control means for controlling the coupling means and the driving means.

11. In combination, an elevator, a garage structure providing parking spaces adjacent the elevator, a parking car cooperating with the elevator, electrically-operated traction mechanism mounted on the parking car for moving the parking car from the elevator to the parking spaces, electrically-operated coupling mechanism mounted on the parking car for coupling the parking car to an automobile, a control panel carried by the elevator, a manual means on the control panel for controlling the electrically-operated traction mechanism, manual means on the control panel controlling the electrically-operated coupling mechanism, and flexible means connecting the manual means on the control panel with the electrically-operated mechanism on the parking car.

12. In combination, an elevator, a garage structure providing parking spaces adjacent the elevator, a parking car cooperating with the elevator, an electric motor for moving the parking car from the elevator to the parking spaces, coupling mechanism for coupling the parking car to an automobile, a second electric motor for operating the coupling mechanism, a control panel carried by the elevator, manual means on the control panel for controlling the first motor, manual means on the control panel for controlling the second motor, and flexible means connecting the manual means on the control panel with the said motors.

13. In combination, an elevator, a garage structure providing parking spaces adjacent the elevator, a track on the elevator, a track in the parking space and alined with the track on the elevator, each of said tracks comprising a pair of L-shaped members with their horizontal parts turned toward each other, a parking car cooperating with the elevator and adapted to be guided by the tracks, supporting wheels mounted on the parking car and adapted to ride over the horizontal parts of the track members, and a guiding member extending from each side of the parking car, said guiding members engaging the vertical parts of the track members to guide the movements of the parking car.

14. In a garage for storing vehicles, the combination with an elevator platform for receiving a vehicle and a storage compartment, of means movable on said elevator platform, said means being engageable with an axle of the motor vehicle to move said vehicle from said elevator platform into said storage compartment, and guiding means for said movable means and for said vehicle while the latter is being transferred.

15. In a garage for storing vehicles, the combination with an elevator for receiving a vehicle and another vehicle receiving means, of means movable on said elevator, said means being movable beneath the vehicle and engageable therewith to move said vehicle from said elevator into said other vehicle receiving means, guiding means for said movable means, and independent guiding means for said vehicle while the latter is being transferred.

16. In a garage for storing vehicles, the combination with a movable vehicle carrier and a vehicle receiving means, of means movable on said carrier and independent thereof, said means being movable beneath the vehicle and engageable therewith to move said vehicle from said carrier into said vehicle receiving means, guiding means for said movable means, and independent guiding means for said vehicle while the latter is being transferred.

17. In a garage for storing vehicles, the combination with a movable vehicle carrier and a vehicle receiving means, of means movable on said carrier, said means being movable beneath the vehicle and engageable therewith to move said vehicle from said carrier into said vehicle receiving means, guiding means for said movable means, and independent guiding means for said vehicle while the latter is being transferred.

18. In combination, a building structure comprising a row of contiguous receiving stands, a row of contiguous delivery stands spaced from the row of receiving stands, an elevator adapted to move vertically in the space between the receiving stands and the delivery stands, the elevator being open toward the receiving stands and toward the delivery stands, a row of storage stands located on one side of the elevator on a floor vertically spaced from the receiving stands, and a row of storage stands located on the opposite side of the elevator on a floor vertically spaced from the receiving stands, a parking car carried by the elevator and adapted to run from either end of the elevator to a position completely under a vehicle and to engage the vehicle and move it onto the elevator.

19. The combination set forth in claim 18 in which the platform of the elevator and each of the stands is provided with trackways for guiding the parking car, the trackways in the stands being non-tiltable and being stationarily fixed relative to the walls of the building.

20. In combination, a building having a plurality of vertically spaced floors, an elevator shaftway, an elevator mounted for vertical movement in said shaftway and open only at two opposite ends, a receiving stand, one end of the receiving stand being open to serve as a receiving end for vehicles to be stored, the opposite end of the receiving stand being contiguous to said shaftway and being open to discharge into said shaftway, the receiving stand being provided with a guiding trackway extending straight from the receiving end to the discharge end, the receiving stand being adapted to receive a vehicle to be stored with the long axis of the vehicle parallel to the guiding trackway, a delivery stand on the side of the shaftway opposite that on which the receiving stand is located, the end of the delivery stand contiguous to the shaftway being open to serve as a receiving end, the opposite end of each delivery stand being open to serve as a discharge end, the delivery stand being provided with a guiding trackway extending straight from the receiving end to the discharge end; a plurality of storage stands on each side of the shaftway and spaced vertically from the receiving stand, each storage stand having an end open toward said shaftway and being provided with a non-tiltable stationarily fixed guiding trackway, the elevator being provided with a non-tiltable guiding trackway, the trackways in the storage and delivery stands and elevator all being parallel to the trackways in the receiving stand, a wheeled parking car carried by the elevator and guided by said trackways, the parts being arranged to permit the parking car to run from the elevator into the receiving stand in a direction parallel to the long axis of the vehicle and to run completely under the vehicle, coupling means carried by the parking car and movable into engagement with the vehicle, and power means for causing the parking car to move the vehicle from the receiving stand to the elevator.

21. In a garage for storing vehicles, the combination with an elevator for receiving a vehicle and another vehicle-receiving means, a wheeled parking car movable on said elevator, said parking car being movable to a position beneath the vehicle and carrying means for causing the vehicle to move with said parking car from said elevator into said other vehicle receiving means, guiding means for the parking car, and guiding means independent from said first-named guiding means for guiding said vehicle while the latter is being moved by the parking car from the elevator to said other vehicle-receiving means.

22. In combination, a building having a plurality of vertically spaced floors, a plurality of contiguous elevator shaftways; elevators mounted for vertical movement in said shaftways, said elevators being open only at two opposite ends and being provided with guiding trackways; a plurality of contiguous receiving stands, one end of each receiving stand being open to serve as a receiving end for vehicles to be stored, the opposite end of each receiving stand being contiguous to and discharging into said shaftway, each receiving stand being provided with a guiding trackway extending straight from the receiving end to the discharge end, the receiving end being adapted to receive a vehicle to be stored with the long axis of the vehicle parallel to the guiding trackway; a plurality of contiguous delivery stands on the side of the elevator shaftways opposite that on which the receiving stand is located, the end of each delivery stand contiguous to the shaftway serving as a receiving end and the opposite end serving as a discharge end, each delivery stand being provided with a guiding trackway extending straight from the receiving end to the discharge end; each of the receiving stands having alined therewith a plurality of superposed storage stands on each side of the corresponding elevator shaftway, each storage stand having an end open toward said shaftway and being provided with a guiding trackway; the guiding trackways in the receiving, storage, and delivery stands all being stationary and parallel to the trackways on the elevators; each elevator having at least one wheeled parking car guided by said trackways, the parts being arranged to permit the parking car to run completely under a motor vehicle parked in one of said stands in a direction parallel to the long axis of the vehicle, coupling means carried by the parking car and movable into engagement with the vehicle, and power means for causing the parking car to move the vehicle from the stand onto the elevator.

23. The combination set forth in claim 22, in which the elevator carries control means for the coupling means and control means for the power means of the parking car.

MILTON A. KENT.